UNITED STATES PATENT OFFICE.

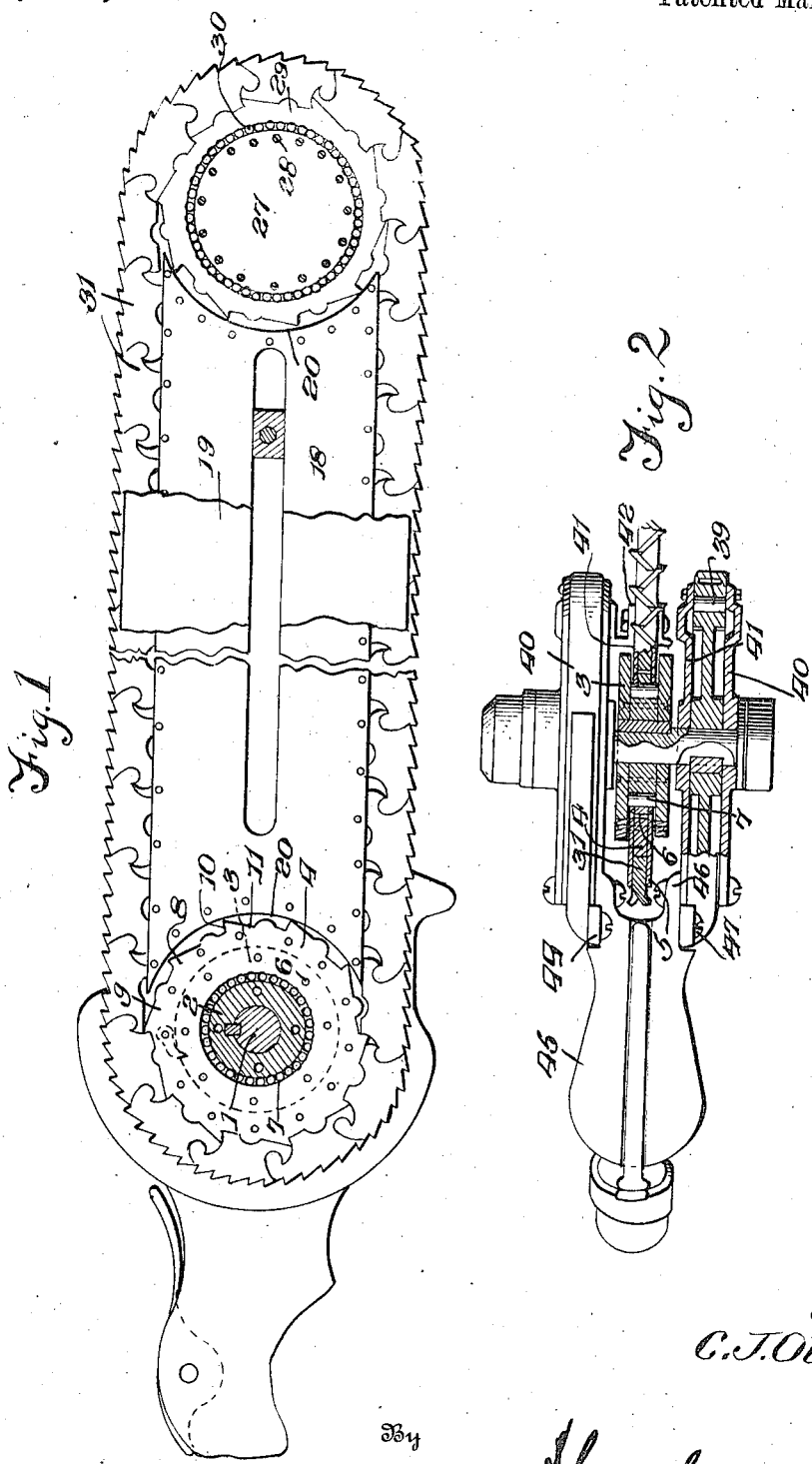

CHARLES J. OLSON, OF MUSKEGON, MICHIGAN.

PNEUMATICALLY-OPERATED CHAIN SAW.

1,260,702.  Specification of Letters Patent.  Patented Mar. 26, 1918.

Application filed May 28, 1912, Serial No. 700,264. Renewed August 21, 1917. Serial No. 187,482.

*To all whom it may concern:*

Be it known that I, CHARLES J. OLSON, a citizen of the United States, residing at Muskegon, in the county of Muskegon and State of Michigan, have invented certain new and useful Improvements in Pneumatically-Operated Chain Saws, of which the following is a specification.

This invention relates to chain saws and has as its object to provide a highly efficient pneumatically operated saw of this type.

One aim of the invention is to provide a pneumatic saw of the type mentioned which will not noticeably vibrate while in operation, will be practically noiseless and may be used in a number of different ways. The saw embodying the present invention, while particularly well designed for use in cutting mortises, may in different sizes, be employed in a number of different ways.

For a full understanding of the invention reference is to be had to the following description and accompanying drawing, in which:—

Figure 1 is a view partly in side elevation and partly in vertical longitudinal section of the saw constructed in accordance with the present invention.
Fig. 2 is a top plan view thereof, parts being shown in section.

Corresponding and like parts are referred to in the following description and indicated in all the views of the accompanying drawings by the same reference characters.

In the drawings, the power shaft of the saw is indicated by the numeral 1 and this shaft supports the power sprocket of the saw and the compressed air motors which operate to rotate the shaft. The sprocket mentioned includes in its structure a body consisting of a collar 2 to the opposite faces of which are secured flanges 3, the parts being connected preferably by rivets. This collar is keyed or otherwise secured upon the shaft 1 at a point substantially midway between the ends of the shaft and, as will be presently explained is located between the two compressed air motors, from which power is derived. The sprocket also includes in its structure an annular disk 4 which is fitted between annular plates 5 and secured thereto by rivets 6, the outer peripheries of the plates 5 being located beyond the peripheries of the disk 4, as clearly shown in Fig. 2 of the drawings. This portion of the sprocket is rotatably received between the flanges 3 of the body thereof and a number of bearing rollers 7 are arranged between the flanges 3 and between the outer periphery of the collar 2 and the inner peripheries of the disk 4 and plates 5. The periphery of the disk 4 is of the form shown in Fig. 1 of the drawings and is provided with a number of shoulders 8 and teeth 9. Each of the shoulders 8 has an abrupt face 10 which is radial to the axis of the disk and between each of the shoulders 8 the periphery of the disk extends tangentially with respect to the axis thereof as indicated at 11. Each tooth 9 is formed upon one of the tangentially extending peripheral portions of the disk and consequently each tooth is located in advance of one of the shoulders 8.

The stock of the saw consists of a plate 18 and cheek-plates 19 which are riveted or otherwise secured against the opposite faces of the plate 18. The plate 18 may be of any desired length and its upper and lower edges are parallel as shown in Fig. 1 its end-edges being concave as at 20 so as to receive the power and driven sprockets of the saw as shown in the said figure.

The cheek-plates 19 are of greater length than the plate 18 and these plates at the forward or working end of the saw are consequently spaced. The driven sprocket of the saw is arranged between the said spaced portions of the plates 19 as will now be explained. A disk 27 is riveted or otherwise secured as at 28 between the spaced portions of the plates 19 and is of circular outline. The sprocket proper is in the form of an annulus 29 having a circular inner periphery and this annulus is arranged between the plates 19 and in position surrounding the disk 27. A number of bearing rollers 30 are arranged between the periphery of the disk and the said inner periphery of the annulus and serve to reduce friction between the parts as the annulus rotates. The outer periphery of the member 29 is identical in form with that of the disk 4 of the power sprocket, as will be apparent from inspection of Fig. 1 of the drawings.

The saw proper consists of a number of links 31 which are detachably connected to form a chain which is trained about the power and driven sprockets in a manner shown in Fig. 1 of the drawings.

It will be observed that the toothed edges of the links project beyond the edges of the cheek-plates 19, both at the sides and ends of these plates so that the upper, lower, or forward end of the saw stock may be presented to the work.

As before stated, two compressed air motors are arranged upon the power shaft 1, one located at each side of the power sprocket, and these motors are of counterpart construction and as they may be of any desired and suitable construction they will not be specifically described. It may be stated, however, that each of the compressed air motors above mentioned includes a casing consisting of a substantially annular body 39 to the opposite sides of which are secured heads 40 and 41. These heads are formed axially with openings through which the shaft 1 is rotatably fitted and the head 41 of each casing is provided with a laterally projecting flange 42 which is secured by means of bolts or similar fastening devices 43 to the inner ends of the cheek-plates 19. Each head 41 is further formed with a rearwardly projecting flange 44 and the handle of the saw which is indicated in general by the reference numeral 45 is formed in its forward end with forwardly projecting flanges 46 to which the flanges 44 are secured by means of screws 47.

It will be readily understood that the principles of the invention could be embodied in a band-saw, if desired.

Having thus described the invention what is claimed as new is:—

1. In a chain saw machine, a handle, a head carried by the handle, spaced motors supported by the head, the axis of the handle being located in a plane between the motors, a sprocket arranged between the motors and driven therefrom, and a chain saw trained about the sprocket.

2. In a chain saw machine, a handle, a head carried by the handle, motors supported by the head in spaced relation to each other, the axis of the handle being located in a plane between the motors, a shaft extending between the motors and driven thereby, a stock extending from the head in a plane between the motors, a chain saw supported for travel upon the stock, and operative connection between the said shaft and the said chain saw.

3. In a chain saw machine, a handle, a head carried thereby, motors supported upon the head in spaced relation to each other, the axis of the handle being located in a plane between the motors, a stock extending from the head between the motors, a shaft extending between the motors and driven therefrom, a sprocket carried by the shaft and rotated thereby, a sprocket carried at the end of the stock remote from the motor shaft, and a chain saw trained over the said sprockets and traveling upon the stock.

4. In a device of the class described, a stock comprising a plate, cheek-plates secured upon opposite sides of the first mentioned plate and projecting at corresponding ends beyond one end of the first mentioned plate, a disk mounted between said projecting ends of the second mentioned plates, an annular sprocket rotatably mounted upon the disk between the said projecting ends of the second mentioned plates, a sprocket mounted at the other end of the first mentioned plate a chain saw trained about the said sprockets, and means for rotating the last mentioned sprocket.

In testimony whereof I affix my signature in presence of two witnesses.

CHARLES J. OLSON. [L. S.]

Witnesses:
FRANK E. HATHAWAY,
LEO CUDDOHY.